US011157327B2

(12) United States Patent
Yao et al.

(10) Patent No.: US 11,157,327 B2
(45) Date of Patent: Oct. 26, 2021

(54) MULTI-RESOURCE SCHEDULING METHOD RESPONDING TO UNCERTAIN DEMAND IN CLOUD SCHEDULER

(71) Applicant: SHANGHAI JIAO TONG UNIVERSITY, Shanghai (CN)

(72) Inventors: Jianguo Yao, Shanghai (CN); Ruhui Ma, Shanghai (CN); Xin Xu, Shanghai (CN); Haibing Guan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 573 days.

(21) Appl. No.: 16/093,585

(22) PCT Filed: Jul. 13, 2016

(86) PCT No.: PCT/CN2016/089898
§ 371 (c)(1),
(2) Date: Oct. 12, 2018

(87) PCT Pub. No.: WO2017/177567
PCT Pub. Date: Oct. 19, 2017

(65) Prior Publication Data
US 2021/0224135 A1 Jul. 22, 2021

(30) Foreign Application Priority Data
Apr. 13, 2016 (CN) .......................... 201610228390.7

(51) Int. Cl.
*G06F 9/46* (2006.01)
*G06F 9/50* (2006.01)
(Continued)

(52) U.S. Cl.
CPC .......... *G06F 9/5083* (2013.01); *G06F 9/4881* (2013.01); *H04L 67/1004* (2013.01)

(58) Field of Classification Search
CPC ... G06F 9/5083; G06F 9/4881; H04L 67/1004
See application file for complete search history.

(56) References Cited

U.S. PATENT DOCUMENTS 9,672,064 B2 * 6/2017 Gupta ................... G06F 9/5044
2011/0125539 A1 5/2011 Bollapragada et al.

FOREIGN PATENT DOCUMENTS

CN 102004671 A 4/2011
CN 103220337 A 7/2013
(Continued)

OTHER PUBLICATIONS

Wang, Jun et al. "Model and Hybrid Genetic Algorithm for Robust Multi-objective Linear Programming"; Application Research of Computers; 2013, vol. 30, No. 9, pp. 2633-2636.
(Continued)

*Primary Examiner* — Camquy Truong
(74) *Attorney, Agent, or Firm* — Fitch, Even, Tabin & Flannery LLP

(57) ABSTRACT

The present invention provides a multi-resource scheduling method responding to uncertain demands in a cloud scheduler, where two computation formulas for fairness and efficiency are used as cost functions in an optimization problem. For some change sets with uncertain resource demands, a robust counterpart of an original non-linear optimization problem is computationally tractable. Therefore, the present invention models features of these sets with uncertain resource demands, i.e., establishes an ellipsoidal uncertainty model. In this model, each coefficient vector is put into a hyper-ellipsoidal space and used as a metric to measure an uncertainty degree. With the ellipsoidal uncertainty model, a non-linear optimization problem is solved and a resource allocation solution that can respond to dynamically changing demands can be obtained.

4 Claims, 3 Drawing Sheets

(51) Int. Cl.
  *G06F 9/48* (2006.01)
  *H04L 29/08* (2006.01)

(56) References Cited

FOREIGN PATENT DOCUMENTS

| CN | 103458052 A | 12/2013 |
| CN | 104932938 A | 9/2015 |
| CN | 105302650 A | 2/2016 |
| CN | 105446817 A | 3/2016 |

OTHER PUBLICATIONS

Armin, Ataei et al. "An Ellipsoid Algorithm for Linear Optimization with Uncertain LMI Constraints"; 2012 American Control Conference; 2012, pp. 857-862.

PCT; App. No. PCT/CN2016/089898; International Search Report dated Dec. 28, 2016.

Li, Li et al. "Research of Resource Scheduling in Cloud Computing Based on Chaos Strategy and Dynamic Adaptive Factor"; Application Research of Computers; vol. 31, No. 6; published Jun. 2014; pp. 1824-1832.

\* cited by examiner

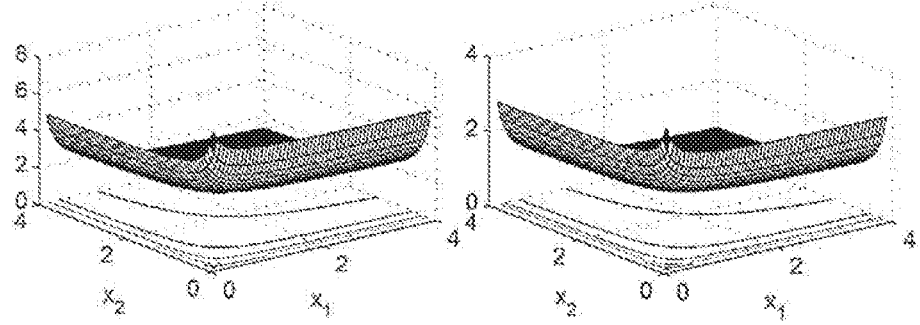
Fig.4        Fig.5
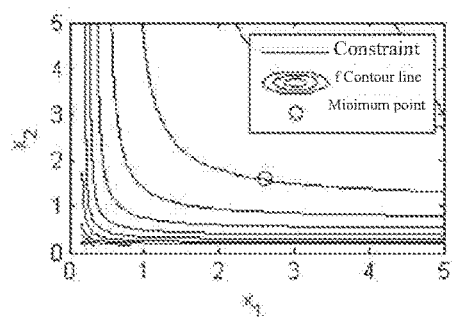 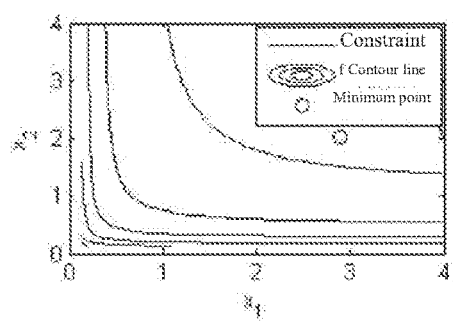
Fig.6        Fig.7
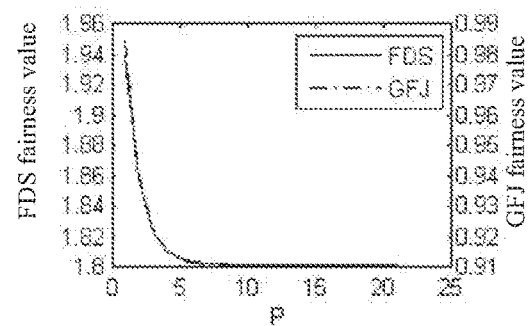
Fig.8
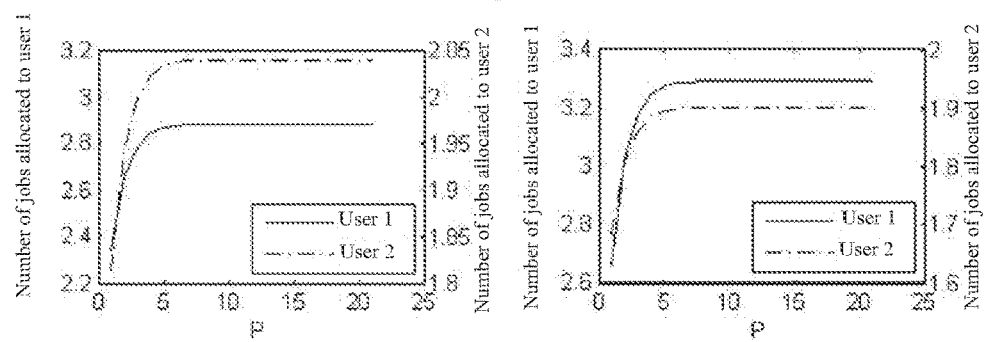
Fig.9        Fig.10

MULTI-RESOURCE SCHEDULING METHOD RESPONDING TO UNCERTAIN DEMAND IN CLOUD SCHEDULER

FIELD OF THE INVENTION

The present invention relates to the field of cloud resource scheduling, and in particular to a multi-resource scheduling method responding to uncertain demands in a cloud scheduler.

DESCRIPTION OF THE PRIOR ART

Cloud computing uses novel computing models and network service models to process computing jobs in a data center. In this case, a great number of users can remotely obtain and use various computing resources, such as a central processing unit (CPU), a graphics processing unit (GPU), a memory, a storage space, and a network bandwidth. These computing resources can be allocated to user-run cloud applications according to an on-demand supply policy by means of technologies such as virtualization and isolation.

The multi-resource allocation technology is a key technology in the cloud computing because efficiency and fairness of resource allocation directly affect performance and economic benefit of the whole cloud computing platform. The resource allocation is a process of efficiently and fairly allocating available physical resources (including computing, storage, and network) to remote cloud users via the network. There is a great challenge in designing an optimum resource allocation policy because of the uncertainty of resource demand and supply. From a perspective of the cloud service supplier, the cloud computing resources cannot be fully supplied to a cloud user in order to maximize resource utilization and economic profit. If it is considered from a perspective of the cloud user, in order to ensure that a job in a cloud application is completed on time, the estimation of cloud resources may exceed an actual demand.

Currently, the conventional resource allocation policies, which are used to allocate resources to cloud applications run by each cloud user, are designed mainly from two different angles. In one case, it only considers allocation of resources of one single type, and there are two widely adopted frameworks, which are Hadoop and Dryad. In such a policy, the cloud computing resources are divided into "bundles" (or "bunches") of a fixed size, a "bundle" is used as an allocation granularity, and such "bundle" can be seen as an abstract of the resources of one single type. Because a cloud application requires multiple types of resources, if it only considers allocation of resources of one type, a serious efficiency loss may be caused. Therefore, the heterogeneousness of resources is considered in the second type of policy, i.e., multiple types of resources are allocated. Ghodsi et al. proposed a multi-resource allocation policy Dominant Resource Fairness (DRF), where a dominant resource is a resource that occupies a maximum proportion in resources allocated to a cloud user (A. Ghodsi, M. Zaharia, B. Hindman, A. Konwinski, S. Shenker, and I. Stoica, "Dominant resource fairness: Fair allocation of multiple resource types" in Proc. of the 8 the USENIX Conference on Networked Systems Design and Implementation. USENIX Association, 2011, pp. 323-336). DRF focuses on the high fairness of resource allocation; however, this may cause an efficiency reduction. Therefore, a unifying multi-resource allocation framework making a tradeoff between efficiency and fairness is proposed (C. Joe-Wong, S. Sen, T. Lan, and M. Chiang, "Multi-resource allocation: Fairness-efficiency tradeoffs in a unifying framework" in Proc. of IEEE INFOCOM 2012. IEEE, March 2012, pp. 1206-1214). This framework includes two types of function sets for modeling the fairness, namely a fairness computing formula Fairness on Dominant Shares (FDS) for dominant resources and a generalized fairness computing formula Generalized Fairness on Jobs (GFJ) for jobs.

a) FDS: The dominant resource is a resource that occupies a maximum proportion in provided resources allocated to a cloud user, and attention should be concentrated on this kind of resources.

If $x_j$ is the number of jobs allocated to the $j^{th}$ cloud user, and the total number of the $i^{th}$ type of resources is $C_i$, then the constraint of a resource number can be expressed as: $\Sigma R_{ij} x_j \leq C_j$, where $R_{ij}$ represents the number of the $i^{th}$ type of resources required by the $j^{th}$ cloud user. This in equation can be rewritten by means of vectors into: $R_i x \leq C_i$, where $R_i = [R_{i1}, R_{i2}, \ldots, R_{in}]$, $x = [x_1, x_2, \ldots, x_j]^T$, where $x_j$ represents the number of jobs allocated to the $j^{th}$ cloud user, and $R_{ij}$ represents a demand of a user job for the $i^{th}$ type of resources. In regard of the $i^{th}$ type of resources, the $j^{th}$ cloud user requires the $i^{th}$ type of resources whose number is $R_{ij}$ to process a job. If $\gamma_{ij} = R_{ij}/C$, where $\gamma_{ij}$ represents a share proportion of $i^{th}$ type of resources required by the $j^{th}$ cloud user to process a job, then a maximum share proportion $\mu_j$ of resources required by each job of the $j^{th}$ cloud user can be expressed as:

$$\mu_j = \max\left\{\frac{R_{ij}}{C_i}\right\},$$

and $\mu_j x_j$ is the dominant resource share proportion of the $j^{th}$ cloud user.

The computation formula $f_{\beta,\lambda}^{FDS}$ of Fairness on Dominant Shares (FDS) is as follows:

$$f_{\beta,\lambda}^{FDS} = \mathrm{sgn}(1-\beta)\left(\sum_{j=1}^{n}\left(\frac{\mu_j x_j}{\sum_{k=1}^{n}\mu_k x_k}\right)^{1-\beta}\right)^{\frac{1}{\beta}}\left(\sum_{j=1}^{n}\mu_j x_j\right)^{\lambda} \quad (1)$$

where $\beta \in \square$ and $\lambda \in \square$ are selected parameters, the parameter $\beta$ represents the type of fairness, the parameter $\lambda$ represents a degree of emphasis on efficiency, and a larger absolute value of $\lambda$ represents greater emphasis on efficiency than on fairness. $f_{\beta,\lambda}^{FDS}$ represents the computation formula of Fairness on Dominant Shares, where sgn(.) represents a sign function, $\square$ represents a real number, $\mu_j$ represents the maximum share proportion of resources required by each job of the $j^{th}$ cloud user, $x_j$ represents the number of jobs allocated to the $j^{th}$ cloud user, $\mu_k$ represents the maximum share proportion of resources required by each job of the $k^{th}$ cloud user, $x_k$ represents the number of jobs allocated to the $k^{th}$ cloud user, and n represents the number of cloud users.

b) GFJ: It is assumed that two cloud users obtain services from one cloud platform, and resources required by each job of cloud user 1 are more than resources required by each job of cloud user 2. From a perspective of FDS, it is fairer to allocate fewer jobs to cloud user 1 than cloud user 2, and efficiency can be improved. However, a common cloud user generally cares for only the number of jobs allocated to himself instead of different resource demands, i.e., a cloud user considers the fairness as the number of jobs allocated to himself. Therefore, another fairness computation formula GFJ is proposed, where GFJ uses only the number of jobs allocated to a cloud user to measure fairness.

The computation formula $f_{\beta,\lambda}^{GFJ}$ for Generalized Fairness on Jobs (GFJ) is as follows:

$$f_{\beta,\lambda}^{GFJ} = \text{sgn}(1-\beta)\left(\sum_{j=1}^{n}\left(\frac{x_j}{\sum_{k=1}^{n}x_k}\right)^{1-\beta}\right)^{\frac{1}{\beta}}\left(\sum_{j=1}^{n}x_j\right)^{\lambda} \quad (2)$$

where $f_{\beta,\lambda}^{GFJ}$ represents the computation formula for Generalized Fairness on Jobs.

The existing conventional resource allocation policies do not take the uncertainty of a resource demand of a cloud user into consideration. On a real cloud platform, a resource demand of a cloud application dynamically changes because of a change in work load. However, the currently existing multi-resource allocation policies are designed on the basis of the following assumption: the number of resources required by a job of a cloud user is static and unchanged. Therefore, these existing policies lack robustness. In a real application scenario, an unpractical allocation solution may be computed according to these policies, thereby causing a great performance loss. This problem is further illustrated herein by one example:

As shown in FIG. 1, it is assumed that two cloud users require virtualized CPUs (vCPUs) and virtualized GPUs (vGPUs) to run a cloud game service. The cloud platform can provide 9 vCPUs and 18 vGPUs in total for the two cloud users to share. Each job of cloud user 1 requires 1 vCPU and 4 vGPUs, and each job of cloud user 2 requires 3 vCPUs and 1 vGPU. Such a case in which a resource demand is static is referred to as scenario 1, in which DRF is used as a resource allocation policy.

In scenario 1, each job of cloud user 1 requires to use ⅑ of the total vCPUs and 2/9 of the total vGPUs, and a dominant resource of cloud user 1 is therefore vGPU; likewise, a dominant resource corresponding to cloud user 2 is vCPU, because each job thereof requires to use ⅓ of the total vCPUs and 1/18 of the total vGPUs. Therefore, DRF allocates 3 jobs, including 3 vCPUs and 12 vGPUs to cloud user 1, and 2 jobs, including 6 vCPUs and 2 vGPUs to cloud user 2. In this case, total five jobs can be processed (see FIG. 1(a)), and both dominant resource share proportions of the two cloud users are ⅔. However, considering a resource demand of a cloud user possesses an essence of uncertainty, the resource demand of a cloud user may change. For example, resources to be used by each job of cloud user 2 change into 3 vCPUs and 2 vGPUs, and the case in which the resource demand is changed is referred to as scenario 2. In this scenario, each job of cloud user 2 requires to use ⅓ of the total vCPUs and ⅑ of the total vGPUs; therefore, the dominant resource of cloud user 2 is still vCPU. DRF does not change numbers of jobs allocated to the two cloud users (see FIG. 1(b)) because DRF does not take the resource demand change into consideration, and this may result in that sufficient resources cannot be allocated to the job of cloud user 2, i.e., the obtained resources are fewer than actually required resources. Thus, such a static allocation policy seriously damages the system robustness.

Therefore, a robust multi-resource allocation policy that takes the dynamic change in a resource demand into consideration needs to be designed, so as to avoid redundant or insufficient resource configuration, thereby satisfying a real resource demand constraint.

SUMMARY OF THE INVENTION

In view of the defects of the prior art, a purpose of the present invention is to provide a multi-resource scheduling method responding to uncertain demands in a cloud scheduler.

The multi-resource scheduling method responding to uncertain demands in a cloud scheduler provided according to the present invention comprises the following steps:

Step 1: setting the following parameters:
$C_i$: a total number of an $i^{th}$ type of resources, wherein i=1, 2, . . . , m, and m represents a resource type number;
$X_0$: an initial value of an allocated-job number X;
$\mu_0$: an initial value of a definite barrier factor $\mu$;
r: a decreasing coefficient;
TolFun: a function tolerance value obtained when iteration terminates;
TolX: an allocated-job number tolerance value obtained when iteration terminates;
MaxIter: a maximum number of iterations
Step 2: letting:

$$\varphi_k(X) = f(X) - \mu_k \sum_{i=1}^{m} \ln[-h_i(X)], k \in N$$

$$h_i(X) = \hat{R}_i^T X + |P_i^T X|_2 - C_i$$

$$x = [x_1, x_2 \ldots x_j]^T$$

wherein
$\varphi_k(X)$ represents a barrier function corresponding to a $k^{th}$ outer loop;
$f(X)$ represents a fairness function corresponding to an optimization object;
X represents the allocated-job number;
$\mu_k$ represents a value of the barrier factor $\mu$ corresponding to the $k^{th}$ outer loop;
$h_i(X)$ represents a slack variable corresponding to the $i^{th}$ type of resources;
N represents a natural number set;
$\hat{R}_i$ represents a demand for the $i^{th}$ type of resources that is corresponding to an ellipsoid center point;
$P_i$ represents a demand change vector corresponding to the $i^{th}$ type of resources;
$x_j$ represents a number of jobs allocated to a $j^{th}$ cloud user;
setting an initial search point $X_0^*$ of $f(X)$ to be $X_0$;
setting an initial search point $x_0^*$ of $\varphi_k(X)$ to be $X_0$;
assigning 0 to a number k of outer loop iterations;
Step 3: assigning fail to a flag newtonFlag, wherein the flag newtonFlag is a flag representing whether the Newton's method can compute a result, and fail represents that the Newton's method cannot compute a result;
Step 4: if $\nabla^2 \varphi_k(X_k)$ is a positive definite matrix, proceeding to step 5; otherwise, proceeding to step 8; wherein $\nabla^2$ represents second derivation, $\varphi_k(X_k)$ represents a barrier function corresponding to an allocated-job number $X_k$ in the $k^{th}$ outer loop, and $X_k$ represents an allocated-job number computed by a $k^{th}$ iteration;
Step 5: assigning 0 to a number s of inner loop iterations;

Step 6: assigning $$x_s^* - \frac{\nabla \varphi_k(x_s^*)}{\nabla^2 \varphi_k(x_s^*)}$$

to a search point $x_{s+1}^*$ of an $(s+1)^{th}$ inner loop of $f(X)$, and adding 1 to a value of s, wherein $\nabla$ represents first derivation;

Step 7: if $\|\varphi_k(x_s^*)-\varphi_k(x_{s-1}^*)\|\leq$TolFun, $\|x_s^*-x_{s-1}^*\|\leq$TolX, or s>MaxIter, proceeding to step 8; otherwise, returning to step 6; wherein $x_s^*$ represents an allocated-job number computed by an $s^{th}$ inner loop, $x_{s-1}^*$ represents an allocated-job number computed by an $(s-1)^{th}$ inner loop, $\varphi_k(x_s^*)$ represents a barrier function corresponding to the allocated-job number $x_s^*$ in the $k^{th}$ outer loop, $\varphi_k(x_{s-1}^*)$ represents a barrier function corresponding to the allocated-job number $x_{s-1}^*$ in the $k^{th}$ outer loop, TolFun represents the function tolerance value obtained when iteration terminates, TolX represents an allocated-job number X tolerance value obtained when iteration terminates, and MaxIter represents the maximum number of iterations;

Step 8: if s≤MaxIter, assigning success to newtonFlag, and proceeding to step 9; or if s>MaxIter, continuing to perform step 9; wherein success represents that the Newton's method can compute a result;

Step 9: if newtonFlag is equal to fail, shifting to step 10; otherwise, shifting to step 15;

Step 10: assigning 0 to the number s of inner loop iterations, and assigning $-\nabla\varphi_k(x_s^*)$ to a search direction $d_k$ corresponding to the $k^{th}$ outer loop;

Step 11: if s>0, assigning $$-\nabla \varphi_k(x_s^*) + \frac{\nabla\varphi_k(x_s^*)^T \nabla\varphi_k(x_s^*)}{\nabla\varphi_k(x_{s-1}^*)^T \nabla\varphi_k(x_{s-1}^*)} d_{s-1}$$

to $d_s$, and proceeding to step 12; otherwise, proceeding to step 12; wherein $d_{s-1}$ represents a search direction corresponding to the $(s-1)^{th}$ inner loop;

Step 12: computing a search step $\alpha_s$ by means of an exact linear search method, assigning $x_s^*+\alpha_s d_s$ to $x_{s+1}^*$, and adding 1 to the value of s, wherein $x_{s+1}^*$ represents an allocated-job number computed by an $(s+1)^{th}$ inner loop, and $d_s$ represents a search direction corresponding to the $s^{th}$ inner loop; for example, the search step $\alpha_s$ can be computed by means of the exact linear search method, wherein the exact linear search method can refer to "Newton's method with exact line search for solving the algebraic Riccati equation," Fakultät für Mathematik, TU Chemnitz Zwickau, 09107 Chemnitz, FRG, Tech. Rep. SPC 95-24, 1995; available as SPC95_24.ps by anonymous ftp from ftp.tu-chemnitz.de, directory/pub/Local/mathematic/Benner;

Step 13: if $\|\varphi_k(x_s^*)\|\leq$TolFun or s>MaxIter, proceeding to step 14; otherwise, proceeding to step 11;

Step 14: if s>MaxIter, assigning 0 to k, and proceeding to step 17; or if s≤Mather, continuing to perform step 15;

Step 15: assigning $x_s^*$ to $X_{k+1}^*$ and $r^*\mu_k$ to $\mu_{k+1}$, and adding 1 to a value of k, wherein $X_{k-1}^*$ represents an allocated-job number computed by a $(k+1)^{th}$ outer loop, $\mu_{k-1}$ represents a barrier factor in the $(k+1)^{th}$ outer loop, and $\mu_k$ represents the barrier factor in the $k^{th}$ outer loop;

Step 16: if $\|f(X_K^*)-f(X_{K-1}^*)\|\leq$TolFun, $\|X_K^*-X_{K-1}^*\|\leq$TolX, or k>MaxIter, proceeding to step 17; otherwise, proceeding to step 3; wherein $X_K^*$ represents an allocated-job number computed by the $k^{th}$ outer loop, $X_{K-1}^*$ represents an allocated-job number computed by a $(k-1)^{th}$ outer loop, $f(X_K^*)$ represents a fairness value corresponding to $X_K^*$, and $f(X_{K-1}^*)$ represents a fairness value corresponding to $X_{K-1}^*$;

Step 17: outputting an optimal fairness value $f(X_K^*)$ and an optimal allocated-job number $X_K^*$ of a cloud user.

Preferably, the multi-resource scheduling method is based on an ellipsoidal uncertainty model;

the ellipsoidal uncertainty model is expressed as:

$$U_i=\{\hat{R}_i+P_i u:\|u\|_2\leq 1\}, i=1,\ldots,m;$$

where $U_i$ represents a demand set corresponding to the $i^{th}$ type of resources, and $P_i$ represents the demand change vector corresponding to the $i^{th}$ type of resources.

Preferably, the multi-resource scheduling method further includes the following step:

Step 18: performing resource scheduling according to the optimal fairness value $f(X_K^*)$ and the optimal allocated-job number $X_K^*$ of the cloud user.

Preferably, the decreasing coefficient r is equal to 0.1;

the function tolerance value TolFun obtained when iteration terminates is equal to 1e-6;

the allocated-job number tolerance value TolX obtained when iteration terminates is equal to 1e-10; and the maximum number MaxIter of iterations is equal to 1000.

Compared with the prior art, the present invention has prominent beneficial effects. Specifically, the multi-resource allocation policy responding to dynamically changing demands according to the present invention makes the following three prominent contributions:

1. The present invention proposes an ellipsoidal uncertainty model, which can be used to capture features of uncertain resource demands.

2. The present invention lists formulas for a non-linear optimization problem of multi-resource allocation that takes a dynamic demand change into consideration in a cloud scheduler.

3. The resource allocation solution computed in the present invention can still obtain the optimal fairness and efficiency in the case of dynamically changing demands, and has well robustness.

BRIEF DESCRIPTION OF THE DRAWINGS

Other features, purposes and advantages of the present invention will be more apparent by reading the detailed description of the non-restrictive embodiments with reference to the drawings below.

FIG. 4 to FIG. 12 form a specific embodiment of the present invention, wherein:

FIG. 4 and FIG. 5 are three-dimensional diagrams of fairness functions, where FIG. 4 corresponds to FDS, and FIG. 5 corresponds to GFJ.

FIG. 6 and FIG. 7 illustrate a constraint function and a minimum point, where FIG. 6 does not take a demand change into consideration, and FIG. 7 takes uncertainty of an ellipsoid into consideration.

FIG. 8 is a curve diagram of fairness changing with P in an ellipsoidal uncertainty model.

FIG. 9 and FIG. 10 are curve diagrams of numbers of jobs allocated to two cloud users changing with P in an ellipsoidal uncertainty model, where FIG. 9 corresponds to FDS, and FIG. 10 corresponds to GFJ.

FIG. 11 and FIG. 12 are curve diagrams of numbers of remaining vCPUs and vGPUs changing with P in an ellipsoidal uncertainty model, where FIG. 11 corresponds to FDS, and FIG. 12 corresponds to GFJ.

DETAILED DESCRIPTION OF THE PREFERRED EMBODIMENTS

The present invention is described in detail below in combination with specific embodiments. The following embodiments will help a person skilled in the art to further understand the present invention, but do not intend to limit the present invention in any way. It should be noted that an ordinary person skilled in the art can further make several changes and improvements without departing from the conception of the present invention, which are all within the protection scope of the present invention.

The present invention provides a cloud scheduler with a new multi-resource allocation policy that can process dynamically changing demands. The policy uses two computation formulas for fairness and efficiency, namely FDS and GFJ, as cost functions in an optimization problem. For some change sets with uncertain resource demands, a robust counterpart of an original non-linear optimization problem is computationally tractable. Therefore, the present invention models features of these sets with uncertain resource demands, i.e., establishes an ellipsoidal uncertainty model. In this model, each coefficient vector is put into a hyper-ellipsoidal space and used as a metric to measure an uncertainty degree. With the ellipsoidal uncertainty model, a non-linear optimization problem is solved, and a resource allocation solution that can respond to dynamically changing demands can be obtained.

The present invention relates to the following three main invention points:

(1) A robust multi-resource allocation management architecture;

(2) A non-linear optimization problem obtained by programming a multi-resource allocation problem aiming at dynamically changing demands.

(3) An ellipsoidal uncertainty model.

The robust multi-resource allocation management architecture is obtained by improving the conventional resource allocation architecture. After fairness and efficiency are considered, a robust multi-resource allocation module is added in, so that it can respond to a case in which a resource demand of a cloud user dynamically changes. In the non-linear optimization problem obtained by means of programming, cost functions adopted are FDS and GFJ. Fairness and efficiency of resource allocation are both taken into consideration, and a resource number is used as a constraint, thereby avoiding redundant or insufficient resource allocation. Because the ellipsoidal uncertainty model can capture features of demand changes, the robust counterpart of the non-linear optimization problem is computationally tractable, and the resource allocation solution that can respond to dynamically changing demands is computed.

Because of the three invention points, the present invention benefits from the ellipsoidal uncertainty model, and the resource allocation solution computed by FDS and GFJ can respond to dynamically changing demands of a cloud user and can have a high efficiency and well fairness.

Figure 1:
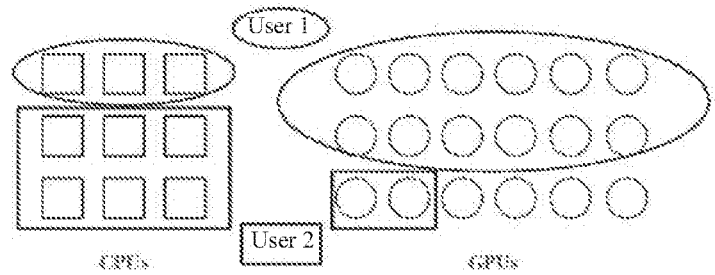
FIG. 1 and FIG. 2 are allocated-job numbers computed by using DRF in contrastive scenarios before and after a change in resource demands, where FIG. 1 corresponds to scenario 1 in which resource demands do not change, and FIG. 2 corresponds to scenario 2 in which resource demands are changeable.
Figure 2:
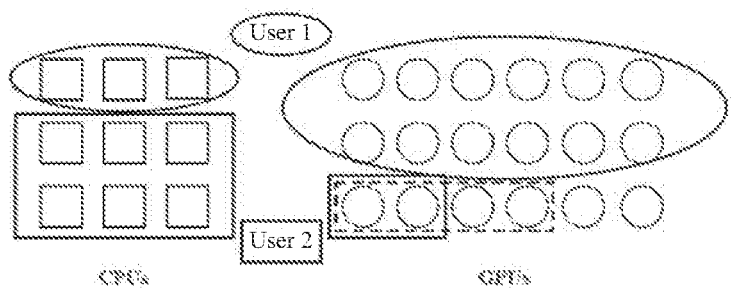
Figure 3:
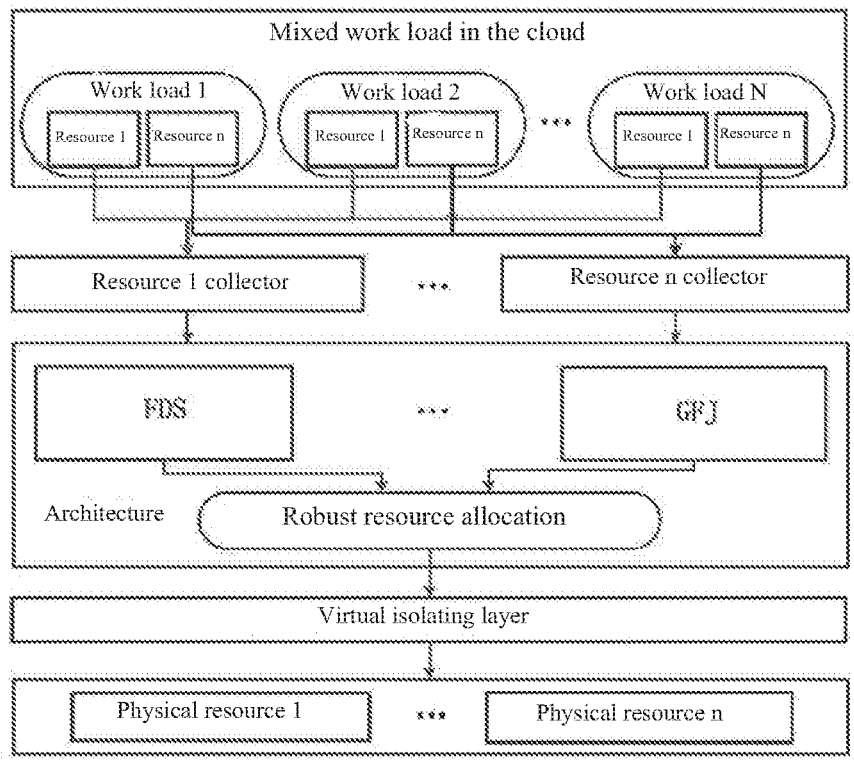
FIG. 3 shows a schematic diagram of a robust multi-resource allocation management architecture according to the present invention.
Figure 11:
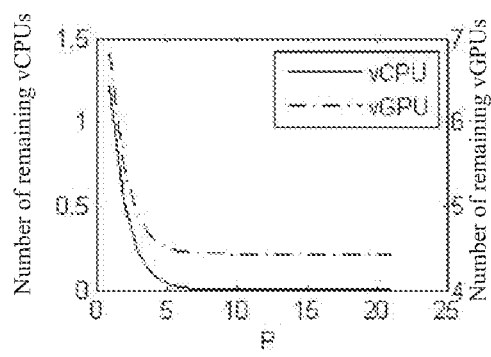
Figure 12:
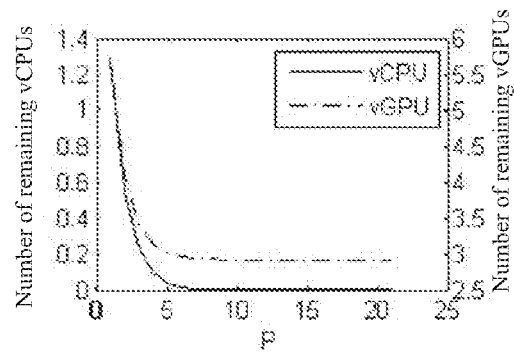

In a framework of FIG. 3, each job (work load) corresponds to a monitor, the monitor is used to monitor running parameters of the corresponding job and communicate with a scheduler. The scheduler serves for two purposes: (1) receiving the running parameters transmitted from the monitor, and using the running parameters as input of scheduling computing; (2) in a compound job, automatically scheduling the job, and using scheduling of the job as output. A purpose of the cloud scheduler in the present invention is to allocate to the cloud user sufficient resources, which cannot be fewer than those required by a cloud user, even for bottleneck resources.

Multi-resource allocation is a non-linear optimization problem, and is expressed as the following inequation:

$$\min_{x}: f(x) \qquad (3)$$
$$\text{s.t. } R_i x \le C_i, i = 1, \ldots, m$$
$$f(x) := \{f_{\beta,\lambda}^{FDS}(x), f_{\beta,\lambda}^{GFJ}(x)\}$$

where $f(x)$ represents a fairness function corresponding to an optimization object, $\min_{x}$: represents minimization := represents value taking, $f_{\beta,\lambda}^{FDS}(x)$ represents a computation function for fairness on dominant shares, $f_{\beta,\lambda}^{GFJ}$ represents a computation function for generalized fairness on jobs, s.t. represents a constraint condition, m represents a number of resource types, $C_i$ represents a total number of an $i^{th}$ type of resources, and $R_i$ represents a demand of a user job for the $i^{th}$ type of resources;

$$R_i = [R_{i1}, R_{i2}, \ldots, R_{ij}]$$

$$x = [x_1, x_2, \ldots, x_j]^T$$

where $R_{ij}$ represents a number of the $i^{th}$ type of resources required by a $j^{th}$ cloud user, and $x_j$ represents a number of jobs allocated to the $j^{th}$ cloud user.

Actually, data (included in the vector $R_i$, i=1, . . . , m) of a resource demand linear constraint is generally unknown. A computation result may be unpractical or even useless if uncertainty of the problem data is not considered when the non-linear optimization problem is being solved. Therefore, a robust multi-resource allocation optimization expression needs to be constructed.

It is assumed that resource demands in non-linear optimization are unknown, and a model of uncertain demands is known. A simplest version of the robust multi-resource allocation optimization expression is first listed herein. Assuming that $R_i$ belongs to an $i^{th}$ given set $U_i$, $U_i \subseteq R^n$, and the set $U_i$ can be seen as a coefficient subset of a linear constraint in formula (3), a robust counterpart of an original non-linear optimization problem of the multi-resource allocation can be expressed as follows:

$$\min_x: f(x) \quad (4)$$
$$\text{s.t. } \forall: R_i \in U_i, R_i x \le C_i, i = 1, \ldots, m$$

Regardless of forms of $U_i$, the robust counterpart is always convex (a feasible region is still an intersection set of half spaces, and differing from the original non-linear optimization problem, solutions included in the feasible region are infinite unless $U_i$ is finite).

For uncertainty sets $U_i$ of some types, robust counterparts are computationally tractable, and modeling can be performed for these types.

A feasible set of a robust counterpart is an intersection set of a single constraint, and is referred to as a robust half space constraint. Assuming that a subset of $R^n$ is given as U, then the robust half space constraint is expressed as follows:

$$\forall: R \in U, Rx \le C \quad (5)$$

A condition on x is always convex regardless of selections of the set U.

R represents a resource demand, $R^n$ represents all possible resource demands, C represents a total resource number, $\forall$: represents a random value, and U represents a resource demand set.

In order to analyze the robust half space constraint, it can be constructed as the following optimization problem expression:

$$C \ge \max_{R \in U}: Rx \quad (6)$$

The maximization problem can be explicitly solved according to some selections of the set U.

Ellipsoidal Uncertainty Model:

The ellipsoidal uncertainty model is in the following form:

$$U = \{R = \hat{R} + Pu : \|u\|_2 \le 1\} \quad (7)$$

where P belongs to $R^{n \times P}$ and is a matrix used to describe a shape of an ellipsoid around an ellipsoid center. If $\rho \ge 0$, $P = \rho I$, then formula (7) represents a simple sphere whose radius $\rho$ is around $\hat{R}$. Such a special case can be referred to as a sphere uncertainty model. U represents a resource demand set, $R^{n \times P}$ represents an ellipsoidal resource demand change set, $\hat{R}$ represents resource demands corresponding to the ellipsoid center, u represents a barrier factor vector, I represents an imaginary number set, and P represents an uncertainty parameter.

The ellipsoidal uncertainty model can process the uncertainty of each part of a coefficient vector. A robust counterpart related to the ellipsoidal model is expressed as follows:

$$C \ge \max_{R \in U}: R^T x = \hat{R}^T x + |P^T x|_2 \quad (8)$$

This formula adopts the Cauchy-Schwartz inequation.
The ellipsoidal uncertainty model is expressed as:

$$U_i = \{\hat{R}_i + P_i u : \|u\|_2 \le 1\}, i = 1, \ldots, m$$

where $U_i$ represents a demand set corresponding to the $i^{th}$ type of resources, $\hat{R}_i$ represents a demand for the $i^{th}$ type of resources that is corresponding to the ellipsoid center, $P_i$ represents a demand change vector corresponding to the type of resources, u represents a vector, and m represents a resource type number.

Therefore, the robust counterpart of the original non-linear optimization problem turns into:

$$\min_x: f(x) \quad (9)$$
$$\text{s.t. } \forall: R_i \in U_i, R_i^T x \le C_i, i = 1, \ldots, m;$$

A second-order cone program (SOCP) thereof is:

$$\min_x: f(x) \quad (10)$$
$$\text{s.t. } \hat{R}_i^T x + |P_i^T x|_2 \le C_i, i = 1, \ldots, m;$$

SOCP is equivalent to linear programming of convex quadratic constraints, and quadric programming of the quadratic constraints can be written as SOCP by adjusting an object function as a constraint condition. Semidefinite programming including SOCPs, which are used as an SOCP constraint, can be written as a linear matrix inequation (LMI), and can be also rewritten into an instance of a semidefinite program. SOCPs can be efficiently solved by means of an inner point method.

More specifically, the multi-resource scheduling method responding to uncertain demands in a cloud scheduler provided by the present invention includes the following steps:

Step 1: setting the following parameters:

$C_i$: a total number of an $i^{th}$ type of resources, wherein i=1, 2, ..., m, and m represents a resource type number;

$X_0$: an initial value of an allocated-job number X;

$\mu_0$: an initial value of a definite barrier factor $\mu$;

r: a decreasing coefficient;

TolFun: a function tolerance value obtained when iteration terminates;

TolX: an allocated-job number tolerance value obtained when iteration terminates;

MaxIter: a maximum number of iterations;

Step 2: letting $$\varphi_k(X) = f(X) - \mu_k \sum_{i=1}^{m} \ln[-h_i(X)], k \in N$$

$$h_i(X) = \hat{R}_i^T X + |P_i^T X|_2 - C_i$$

$$x = [x_1, x_2 \ldots x_j]^T$$

where $\varphi_k(X)$ represents a barrier function corresponding to a $k^{th}$ outer loop;

$f(X)$ represents a fairness function corresponding to an optimization object;

X represents the allocated-job number;

$\mu_k$ represents a value of the barrier factor $\mu$ corresponding to the $k^{th}$ outer loop;

$h_i(X)$ represents a slack variable corresponding to the $i^{th}$ type of resources;

N represents a natural number set;

$\hat{R}_i$ represents a demand for the $i^{th}$ type of resources that is corresponding to an ellipsoid center point;

$P_i$ represents a demand change vector corresponding to the $i^{th}$ type of resources;

$x_j$ represents a number of jobs allocated to a $j^{th}$ cloud user; setting an initial search point $X_0^*$ of $f(X)$ to be $X_0$; setting an initial search point $x_0^*$ of $\varphi_k(X)$ to be $X_0$; assigning 0 to a number k of outer loop iterations;

Step 3: assigning fail to a flag newtonFlag, wherein the flag newtonFlag is a flag representing whether the Newton's method can compute a result, and fail represents that the Newton's method cannot compute a result;

Step 4: if $\nabla^2 \varphi_k(X_k)$ is a positive definite matrix, proceeding to step 5; otherwise, proceeding to step 8; where $\nabla^2$ represents the second derivation, $\varphi_k(X_k)$ represents a barrier function corresponding to an allocated-job number $X_k$ in the $k^{th}$ outer loop, and $X_k$ represents an allocated-job number computed by a $k^{th}$ iteration;

Step 5: assigning 0 to a number s of inner loop iterations;
Step 6: assigning $$x_s^* - \frac{\nabla \varphi_k(x_s^*)}{\nabla^2 \varphi_k(x_s^*)}$$

to a search point $x_{s+1}^*$ of an $(s+1)^{th}$ inner loop of $f(X)$, adding 1 to a value of s, wherein $\nabla$ represents the first derivation;

Step 7: if $\|\varphi_k(x_s^*) - \varphi_k(x_{s-1}^*)\| \leq \text{TolFun}$, $\|x_s^* - x_{s-1}^*\| \leq \text{TolX}$, or s>MaxIter, proceeding to step 8; otherwise, returning to step 6; where $x_s^*$ represents an allocated-job number computed by an $s^{th}$ inner loop, $x_{s-1}^*$ represents an allocated-job number computed by an $(s-1)^{th}$ inner loop, $\varphi_k(x_s^*)$ represents a barrier function corresponding to the allocated-job number $x_s^*$ in the $k^{th}$ outer loop, $\varphi_k(x_{s-1}^*)$ represents a barrier function corresponding to the allocated-job number $x_{s-1}^*$ in the $k^{th}$ outer loop, TolFun represents the function tolerance value obtained when iteration terminates, TolX represents the allocated-job number X tolerance value obtained when iteration terminates, and MaxIter represents the maximum number of iterations;

Step 8: if s≤MaxIter, assigning success to newtonFlag, and proceeding to step 9; or if s>MaxIter, continuing to perform step 9; where success represents that the Newton's method can compute a result;

Step 9: if newtonFlag is equal to fail, shifting to step 10; otherwise, shifting to step 15;

Step 10: assigning 0 to the number s of inner loop iterations, and assigning $-\nabla(x_s^*)$ to a search direction $d_k$ corresponding to the $k^{th}$ outer loop;

Step 11: if s>0, assigning $$-\nabla \varphi_k(x_s^*) + \frac{\nabla \varphi_k(x_s^*)^T \nabla \varphi_k(x_s^*)}{\nabla \varphi_k(x_{s-1}^*)^T \nabla \varphi_k(x_{s-1}^*)} d_{s-1}$$

to $d_s$, and proceeding to step 12; otherwise, proceeding to step 12; where $d_{s-1}$ represents a search direction corresponding to the $(s-1)^{th}$ inner loop;

Step 12: computing a search step $\alpha_s$ by means of an exact linear search method, assigning $x_s^* + \alpha_s d_s$ to $x_{s+1}^*$, and adding 1 to the value of s, where $x_{s+1}^*$ represents an allocated-job number computed by an $(s+1)^{th}$ inner loop, and $d_s$ represents a search direction corresponding to the $s^{th}$ inner loop; for example, the search step $\alpha_s$ can be computed by means of the exact linear search method, where the exact linear search method can refer to "Newton's method with exact line search for solving the algebraic Riccati equation," Fakultät für Mathematik, TU Chemnitz Zwickau, 09107 Chemnitz, FRG; Tech. Rep. SPC 95-24, 1995; available as SPC95_24.ps by anonymous ftp from ftp.tu-chemnitz.de, directory/pub/Local/mathematic/Benner;

Step 13: if $\|\varphi_k(x_s^*)\| \leq \text{TolFun}$ or s>MaxIter, proceeding to step 14; otherwise, proceeding to step 11;

Step 14: if s>MaxIter, assigning 0 to k, and proceeding to step 17; or if s≤Mather, continuing to perform step 15;

Step 15: assigning $x_s^*$ to $X_{k+1}^*$ and $r^*\mu_k$ to $\mu_{k+1}$, and adding 1 to k, where $X_{k+1}^*$ represents an allocated-job number computed by a $(k+1)^{th}$ outer loop, $\mu_{k+1}$ represents a barrier factor in the $(k+1)^{th}$ outer loop, and $\mu_k$ represents the barrier factor in the $k^{th}$ outer loop;

Step 16: if $\|f(X_K^*) - f(X_{K-1}^*)\| \leq \text{TolFun}$, $\|X_K^* - X_{K-1}^*\| \leq \text{TolX}$, or k>MaxIter, proceeding to step 17; otherwise, proceeding to step 3; where $X_K^*$ represents an allocated-job number computed by the $k^{th}$ outer loop, $X_{K-1}^*$ represents an allocated-job number computed by a $(k-1)^{th}$ outer loop, $f(X_K^*)$ represents a fairness value corresponding to $X_K^*$, and $f(X_{K-1}^*)$ represents a fairness value corresponding to $X_{K-1}^*$;

Step 17: outputting an optimal fairness value $f(X_K^*)$ and an optimal allocated-job number $X_K^*$ of a cloud user; and Step 18: performing resource scheduling according to the optimal fairness value $f(X_K^*)$ and the optimal allocated-job number $X_K^*$ of the cloud user.

In a preferred embodiment, the multi-resource scheduling method is based on an ellipsoidal uncertainty model;

the ellipsoidal uncertainty model is expressed as:

$$U_i = \{\bar{R}_i + P_i u : \|u\|_2 \leq 1\}, i=1, \ldots, m;$$

where $U_i$ represents a demand set corresponding to the $i^{th}$ type of resources, and $P_i$ represents the demand change vector corresponding to the $i^{th}$ type of resources;

the decreasing coefficient r is equal to 0.1;

the function tolerance value TolFun obtained when iteration terminates is equal to 1e-6;

the allocated-job number tolerance value TolX obtained when iteration terminates is equal to 1e-10;

The maximum number MaxIter of iterations is equal to 1000.

In this embodiment, the cloud platform provides vCPU and vGPU resources, there are two cloud users needing to run a game job, and resource demands thereof are changing. It is assumed that a job can be allocated infinitely. In order to measure the performance, non-indefinite parameters are used as references: each job of cloud user 1 requires 1 vCPU and 4 vGPUs, and each job of cloud user 2 requires 3 vCPUs and 4 vGPUs. The cloud platform provides 9 vCPUs and 18 vGPUs in total. Fairness functions, namely FDS (formula (1)) and GFJ (formula (2)), are designated as cost functions.

FIG. 8 illustrates three-dimensional diagrams of the fairness functions of this embodiment. It can be known from the figure that FDS and GFJ are always convex regardless of constraints. This means that optimal FDS and GFJ fairness values can always be computed. In this embodiment, the parameter β=2, and λ=−0.5.

The ellipsoid uncertainty parameter is selected to be $P_i = P^i$, i=1, 2, . . . , 21, where the parameter $$P = \begin{pmatrix} 0.1 & 0.2 \\ 0.3 & 0.2 \end{pmatrix},$$

and $P^i$ represents $i^{th}$ power of P.

It can be found by comparing FIG. 6 and FIG. 7 that compared with a conventional resource allocation method, more jobs can be allocated to a cloud user in the ellipsoidal uncertainty model.

FIG. 8 shows that a better fairness value can be obtained when P increases, and fairness values computed by FDS and GFJ converge to 1.8 rapidly with the increase of P.

In FIG. 9 to FIG. 12, numbers of jobs allocated to the two cloud users gradually increase with the increase of P, and remaining vCPUs and vGPUs are reduced. This means that both FDS and GFJ resource allocation policies can have high efficiencies in the ellipsoidal uncertainty model.

The specific embodiments of the present invention are described above. It should be understood that the present invention is not limited to the specific implementation manners described above, and a person skilled in the art could make various changes or modifications within the scope of the Claims, which does not affect the substantive content of the present invention. In the case of no conflict, the embodiments of the present application and the features in the embodiments can be combined randomly.

The invention claimed is:

1. A multi-resource scheduling method responding to uncertain demands in a cloud scheduler, comprising:

Step 1: setting the following parameters:

$C_i$: a total number of an $i^{th}$ type of resources, wherein $i=1, 2, \ldots, m$, and m represents a resource type number;

$X_0$: an initial value of an allocated-job number X;

$\mu_0$: an initial value of a definite barrier factor $\mu$;

r: a decreasing coefficient;

TolFun: a function tolerance value obtained when iteration terminates;

TolX: an allocated-job number tolerance value obtained when iteration terminates;

MaxIter: a maximum number of iterations;

Step 2: letting:

$$\varphi_k(X) = f(X) - \mu_k \sum_{i=1}^{m} \ln[-h_i(X)], k \in N$$

$$h_i(x) = \hat{R}_i^T X + |P_i^T x|_2 - C_i$$

$$x = [x_1, x_2, \ldots x_j]^T$$

wherein $\sigma_k(X)$ represents a barrier function corresponding to a $k^{th}$ outer loop;

$f(X)$ represents a fairness function corresponding to an optimization object;

X represents the allocated-job number;

$\mu_k$ represents a value of the barrier factor $\mu$ corresponding to the $k^{th}$ outer loop;

$h_i(X)$ represents a slack variable corresponding to the $i^{th}$ type of resources;

N represents a natural number set;

$\hat{R}_i$ represents a demand for the $i^{th}$ type of resources that is corresponding to an ellipsoid center point;

$P_i$ represents a demand change vector corresponding to the $i^{th}$ type of resources;

$x_j$ represents a number of jobs allocated to a $j^{th}$ cloud user;

setting an initial search point $X_0^*$ of $f(X)$ to be $X_0$;

setting an initial search point $x_0^*$ of $\sigma_k(X)$ to be $X_0$;

assigning 0 to a number k of outer loop iterations;

Step 3: assigning fail to a flag newtonFlag, wherein the flag newtonFlag is a flag representing whether the Newton's method can compute a result, and fail represents that the Newton's method cannot compute a result;

Step 4: if $\nabla^2 \varphi_k(X_k)$ is a positive definite matrix, proceeding to step 5; otherwise, proceeding to step 8; wherein $\nabla^2$ represents the second derivation, $\varphi_k(X_k)$ represents a barrier function corresponding to an allocated-job number $X_k$ in the $k^{th}$ outer loop, and $X_k$ represents an allocated-job number computed by a $k^{th}$ iteration;

Step 5: assigning 0 to a number s of inner loop iterations;

Step 6: assigning $$x_s^* - \frac{\nabla \varphi_k(x_s^*)}{\nabla^2 \varphi_k(x_s^*)}$$

to a search point $x_{s+1}^*$ of an $(s+1)^{th}$ inner loop of $f(X)$, adding 1 to a value of s, wherein $\nabla$ represents the first derivation;

Step 7: if $\|\varphi_k(x_s^*) - \varphi_k(x_{s-1}^*)\| \leq \text{TolFun}$, $\|x_s^* - x_{s-1}^*\| \leq \text{TolX}$, or s>MaxIter, proceeding to step 8; otherwise, returning to step 6; wherein $x_s^*$ represents an allocated-job number computed by an $s^{th}$ inner loop, $x_{s-1}^*$ represents an allocated-job number computed by an $(s-1)^{th}$ inner loop, $\varphi_k(x_s^*)$ represents a barrier function corresponding to the allocated-job number $x_s^*$ in the $k^{th}$ outer loop, $\varphi_k(x_{s-1}^*)$ represents a barrier function corresponding to the allocated-job number $x_{s-1}^*$ in the $k^{th}$ outer loop, TolFun represents the function tolerance value obtained when iteration terminates, TolX represents an allocated-job number X tolerance value obtained when iteration terminates, and MaxIter represents the maximum number of iterations;

Step 8: if s≤MaxIter, assigning success to newtonFlag, and proceeding to step 9; or if s>MaxIter, continuing to perform step 9; wherein success represents that the Newton's method can compute a result;

Step 9: if newtonFlag is equal to fail, shifting to step 10; otherwise, shifting to step 15;

Step 10: assigning 0 to the number s of inner loop iterations, and assigning $-\nabla \varphi_k(x_s^*)$ to a search direction $d_k$ corresponding to the $k^{th}$ outer loop;

Step 11: if s>0, assigning $$-\nabla \varphi_k(x_s^*) + \frac{\nabla \varphi_k(x_s^*)^T \nabla \varphi_k(x_s^*)}{\nabla \varphi_k(x_{s-1}^*)^T \nabla \varphi_k(x_{s-1}^*)} d_{s-1}$$

to $d_s$, and proceeding to step 12; otherwise, proceeding to step 12; wherein $d_{s-1}$ represents a search direction corresponding to the $(s-1)^{th}$ inner loop;

Step 12: computing a search step $\alpha_s$ by means of an exact linear search method, assigning $x_s^* + \alpha_s d_s$ to $x_{s+1}^*$, and adding 1 to the value of s; wherein $x_{s+1}^*$ represents an allocated-job number computed by an $(s+1)^{th}$ inner loop, and $d_s$ represents a search direction corresponding to the $s^{th}$ inner loop;

Step 13: if $\|\varphi_k(x_s^*)\| \leq \text{TolFun}$ or s>MaxIter, proceeding to step 14; otherwise, proceeding to step 11;

Step 14: if s>MaxIter, assigning 0 to k, and proceeding to step 17; or if s≤MaxIter, continuing to perform step 15;

Step 15: assigning $x_s^*$ to $X_{k+1}^*$ and $r^*\mu_k$ to $\mu_{k+1}$, and adding 1 to k, wherein $X_{k+1}^*$ represents an allocated-job number computed by a $(k+1)^{th}$ outer loop, $\mu_{k+1}$ represents a barrier factor in the $(k+1)^{th}$ outer loop, and $\mu_k$ represents the barrier factor in the $k^{th}$ outer loop;

Step 16: if $\|f(X_K^*)-f(X_{K-1}^*)\| \leq \text{TolFun}$, $\|X_K^* - X_{K-1}^*\| \leq \text{TolX}$, or k>MaxIter, proceeding to step 17; otherwise, proceeding to step 3; wherein $X_K^*$ represents an allocated-job number computed by the $k^{th}$ outer loop, $X_{K-1}^*$ represents an allocated-job number computed by a $(k-1)^{th}$ outer loop, $f(X_K^*)$ represents a fairness value corresponding to $X_K^*$, and $f(X_K^*)$ represents a fairness value corresponding to $X_{K-1}^*$; and Step 17: outputting an optimal fairness value $f(X_K^*)$ and an optimal allocated-job number $X_K^*$ of a cloud user.

2. The multi-resource scheduling method responding to uncertain demands in a cloud scheduler according to claim 1, wherein the multi-resource scheduling method is based on an ellipsoidal uncertainty model;

the ellipsoidal uncertainty model is expressed as:

$U_i = (\hat{R}_i + P_i u : \|u\|_2 \leq 1)$, $i=1, \ldots, m;$ wherein $U_i$ represents a demand set corresponding to the $i^{th}$ type of resources, and $P_i$ represents the demand change vector corresponding to the $i^{th}$ type of resources.

3. The multi-resource scheduling method responding to uncertain demands in a cloud scheduler according to claim 1, wherein the multi-resource scheduling method further comprises the following step:

Step 18: performing resource scheduling according to the optimal fairness value $f(X_K^*)$ and the optimal allocated-job number $X_K^*$ of the cloud user.

4. The multi-resource scheduling method responding to uncertain demands in a cloud scheduler according to claim 1, wherein the decreasing coefficient r is equal to 0.1;

the function tolerance value TolFun obtained when iteration terminates is equal to 1e-6;

the allocated-job number tolerance value TolX obtained when iteration terminates is equal to 1e-10; and the maximum number MaxIter of iterations is equal to 1000.

\* \* \* \* \*